United States Patent [19]

Greenbacker

[11] Patent Number: 4,648,382
[45] Date of Patent: Mar. 10, 1987

[54] DEVICE FOR STEAM COOKING FOOD

[75] Inventor: Dale E. Greenbacker, Meriden, Conn.

[73] Assignee: Daleco, Inc., Meriden, Conn.

[21] Appl. No.: 503,611

[22] Filed: Jun. 13, 1983

[51] Int. Cl.[4] .............................................. A47J 27/06
[52] U.S. Cl. ................................... 126/348; 126/377; 126/268; 219/401; 99/407; 165/919
[58] Field of Search ............... 126/377, 379, 382, 383, 126/246, 268, 348, 369; 165/DIG. 25, DIG. 26, 78, 75, 64, 61, 58, 70; 99/467, 470, 473, 475; 219/401, 403, 523, 275

[56] References Cited

U.S. PATENT DOCUMENTS

| | | | |
|---|---|---|---|
| 2,326,420 | 8/1943 | Vukasinovich | 126/377 |
| 2,576,313 | 11/1951 | Sullivan | 126/377 |
| 2,980,105 | 4/1961 | Wanless | 126/382 |
| 3,456,598 | 7/1969 | MacKay | 219/403 |
| 3,814,901 | 6/1974 | Morharb | 99/473 |
| 3,886,346 | 5/1975 | Meyers | 165/DIG. 26 |
| 4,010,349 | 3/1977 | Lee | 219/401 |
| 4,039,776 | 8/1977 | Roderick | 219/401 |
| 4,103,736 | 8/1978 | Colato et al. | 165/48 R |
| 4,123,969 | 11/1978 | Abbate | 126/348 |
| 4,126,775 | 11/1978 | Wyatt | 126/246 |
| 4,154,861 | 5/1979 | Smith | 99/475 |
| 4,397,298 | 8/1983 | Abell | 126/377 |

FOREIGN PATENT DOCUMENTS

| | | | |
|---|---|---|---|
| 0001135 | 3/1926 | Australia | 165/75 |
| 0024265 | of 1903 | United Kingdom | 126/377 |
| 1294923 | 11/1972 | United Kingdom | 126/348 |

*Primary Examiner*—Samuel Scott
*Assistant Examiner*—H. A. Odar
*Attorney, Agent, or Firm*—St.Onge Steward Johnston & Reens

[57] ABSTRACT

A device for steam cooking food comprising a closed chamber for containing said food and having an access door for insertion and removal of the food. The chamber includes a floor having a plurality of vents therein. A reservoir for containing liquid for producing steam is positioned beneath the vents and transmits steam in one direction, said steam in said chamber producing a condensate containing contaminates from said food, said condensate being transferred through at least one group of said vents to the reservoir. A pan is located beneath said one group of said vents for catching said contaminated condensate.

16 Claims, 4 Drawing Figures

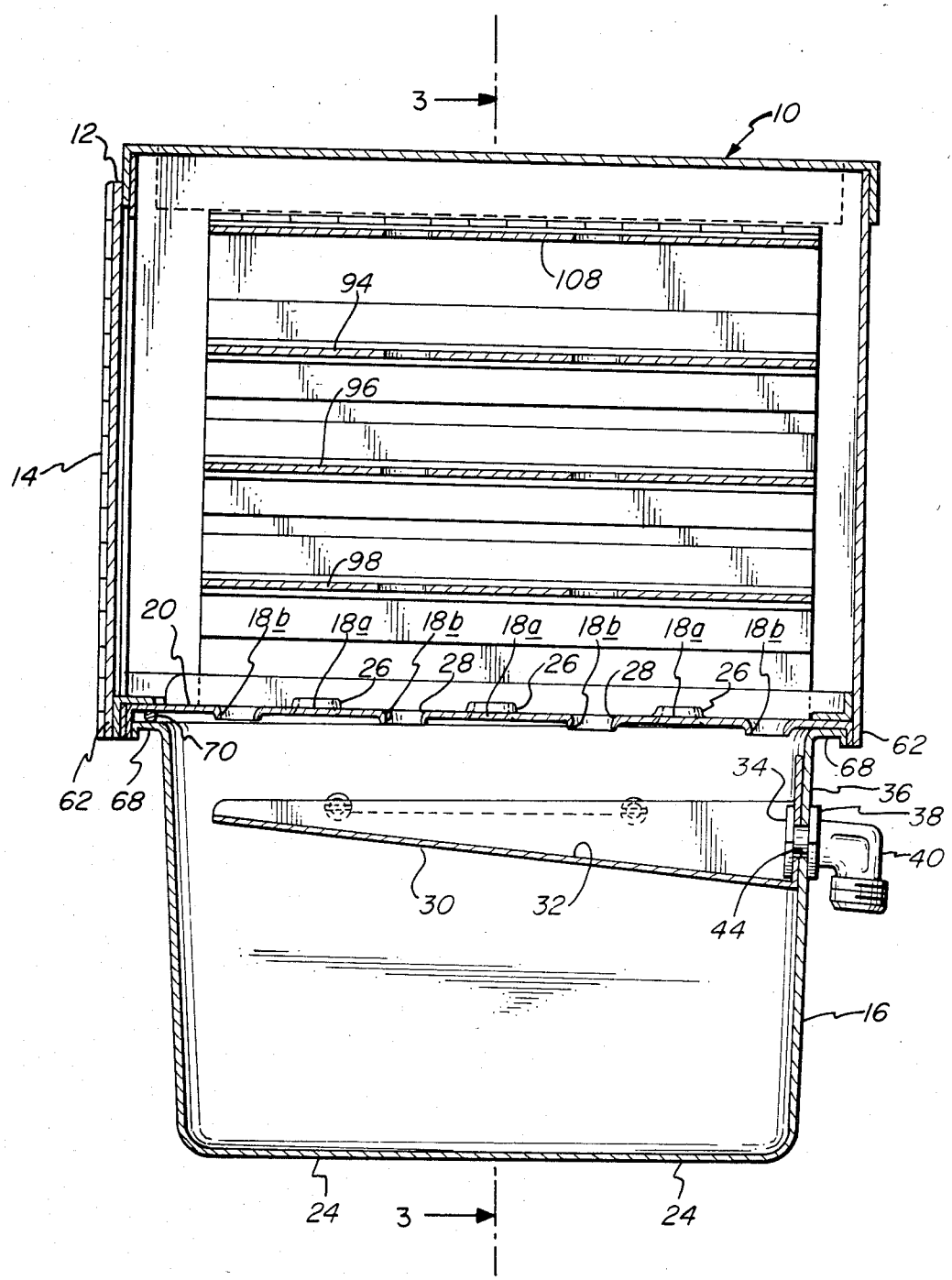

DEVICE FOR STEAM COOKING FOOD

BACKGROUND OF THE INVENTION (1) Field of the Invention

The present invention relates to a device for steam cooking food, and more particularly, the present invention relates to a steam cooking device which operates under low steam pressure and has a chamber for containing the food, the chamber having an access door to enable insertion and removal of food.

(2) Description of the Prior Art

A conventional device for steam cooking food comprises a closed chamber for containing the food as it is cooked. The chamber has an access door for insertion and removal of the food. A conventional steam cooker operates at a relatively low pressure, that is, at or just slightly above atmospheric pressure, as contrasted with steam cookers having a tightly sealed chamber and which operate at high temperature and pressures. A conventional steam cooker is typically used in a small restaurant, an outdoor food service cart, or other places where space is limited. Although a conventional steam cooking device can be used to cook a variety of foods, these types of devices have been used primarily for cooking ground beef.

The steam is provided by a reservoir which is located beneath the floor of the chamber. The floor of the chamber includes a plurality of vents for transmitting steam from the reservoir to the chamber. The reservoir is typically a large pan partially filled with water and having its bottom placed on a heat source such as a gas flame or an electric burner. During the course of cooking the food in the chamber, as steam circulates adjacent the food it becomes contaminated with food particles. In the case where ground beef is cooked, the steam tends to become contaminated with fat and other substances. As the steam is cooled by heat transfer to the food and to the sidewalls of the chamber, the contaminated steam condenses and collects on the floor of the chamber and then drips through the steam vents in the floor of the chamber and back into the reservoir.

As the steam cooking device is operated over a prolonged period of time, the water in the reservoir becomes contaminated with fat and other contaminates. The fat tends to form a layer on top of the water located in the reservoir, thus making difficult the production of steam for further cooking. The buildup of fat and other contaminates in the reservoir results in increased cooking time for the food in the chamber, increased energy consumption, and may result in disflavoring the food being cooked.

A group of shelves are located in the chamber and support various small trays which contain the food. In the case where ground beef is being cooked, the small tray contains beef and each shelf can accommodate four or more trays. The shelves are permanently secured to a frame, which is in turn, secured to the floor of the chamber. As the device is repeatedly used, the shelves and the frame for the shelves become dirty, thus requiring cleaning. Because the shelves are spaced relatively close to each other, and are fixed at right angles with respect to the frame, it is extremely difficult to clean the shelves.

In a conventional steam cooking device, the door is hinged to one sidewall of the chamber. When the door is opened, condensate from the ceiling of the chamber and the sidewall to which the door is secured begins to drip downwardly out of the door opening thereby creating a puddle of condensate in front of the steam cooker. It would be desirable to avoid, or reduce the amount of condensate which drips out of the chamber when the access door is opened.

SUMMARY OF THE INVENTION

In accordance with one aspect of the present invention, the device for steam cooking food comprises a closed chamber for containing the food. The chamber has an access door for insertion and removal of the food, and includes a floor having a plurality of vents therein through which steam circulates from a reservoir in fluid communication with the vents. The steam in the chamber is cooled by contact with the food and the walls of the chamber, and a condensate is produced containing water and contaminates from the food. The condensate containing the contaminate is transferred through at least one group of vents to a pan located beneath said group of vents for catching the contaminated condensate. The pan includes a port for draining condensate from the pan through an opening in the reservoir vessel to thereby remove the contaminated condensate from the device. Removal of contaminated condensate has several advantages including, reduced cooking time for the food, reduced energy comsumption, and avoidance of disflavoring of the food by the contaminates.

In accordance with one aspect of the invention, the floor of the chamber includes a plurality of steam vents, one group of vents providing for transfer of steam from the reservoir into the chamber. A second group of vents provides for transfer of steam from the reservoir and transfer of contaminated condensate from the chamber back into the reservoir. The first group of vents each has around its periphery a dam which prevents drainage of condensate on the floor through the vents. Each of the second group of vents has a periphery that is lower in height than the dam of each of the first group of vents, and, thus condensate is directed downwardly through the second group of vents. The pan is located beneath the second group of vents to catch the condensate, which is thereafter removed from the device.

Additional inventive features, and additional advantages of a device in accordance with the present invention will be described with respect to the following figures.

BRIEF DESCRIPTION OF THE DRAWINGS

FIG. 4 is a sectional view along the plane 4—4 of FIG. 3.

DETAILED DESCRIPTION OF THE INVENTION

Figure 1:
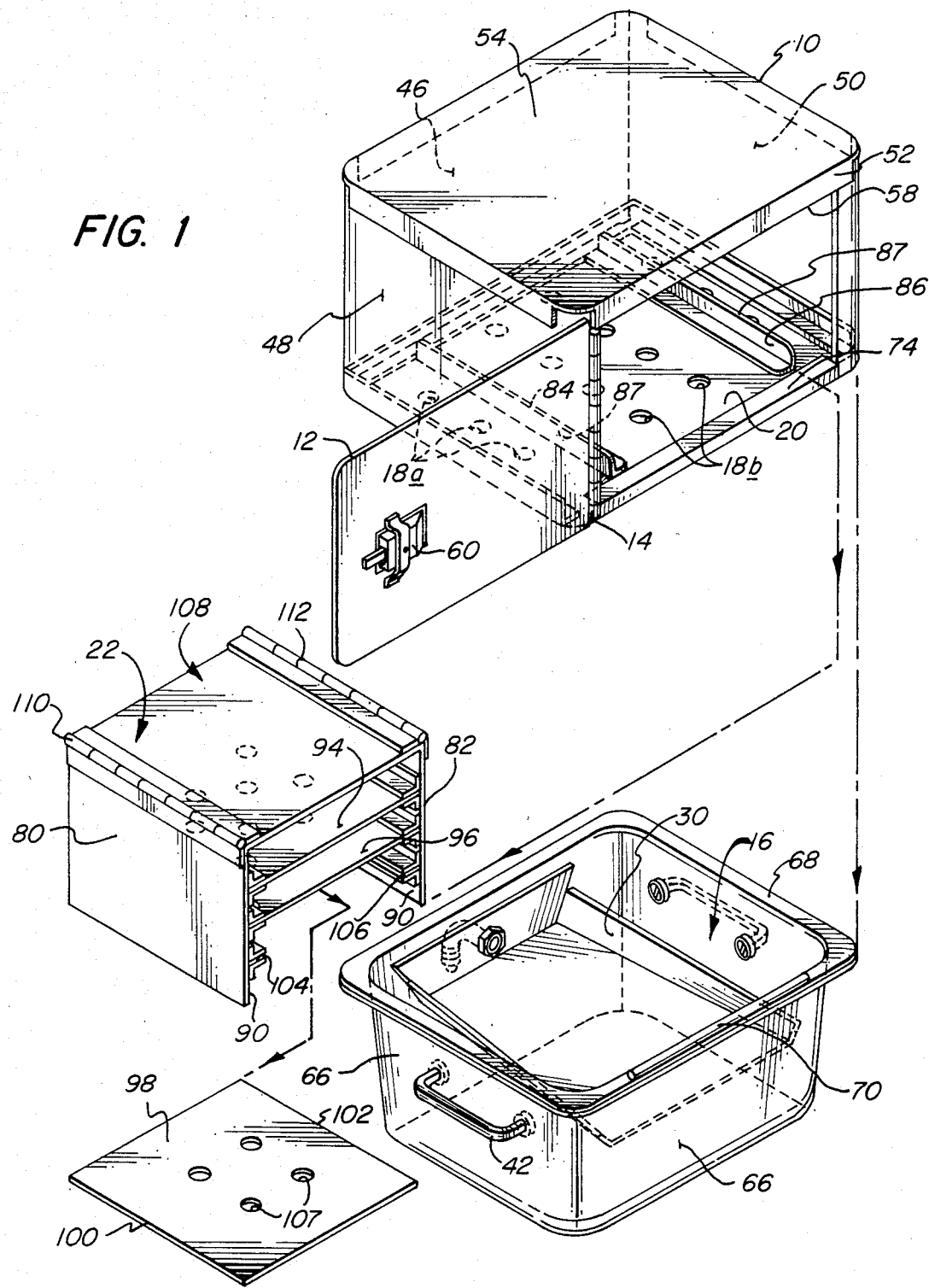
FIG. 1 is an exploded perspective view of a device for steam cooking food in accordance with the present invention.
Figure 2:
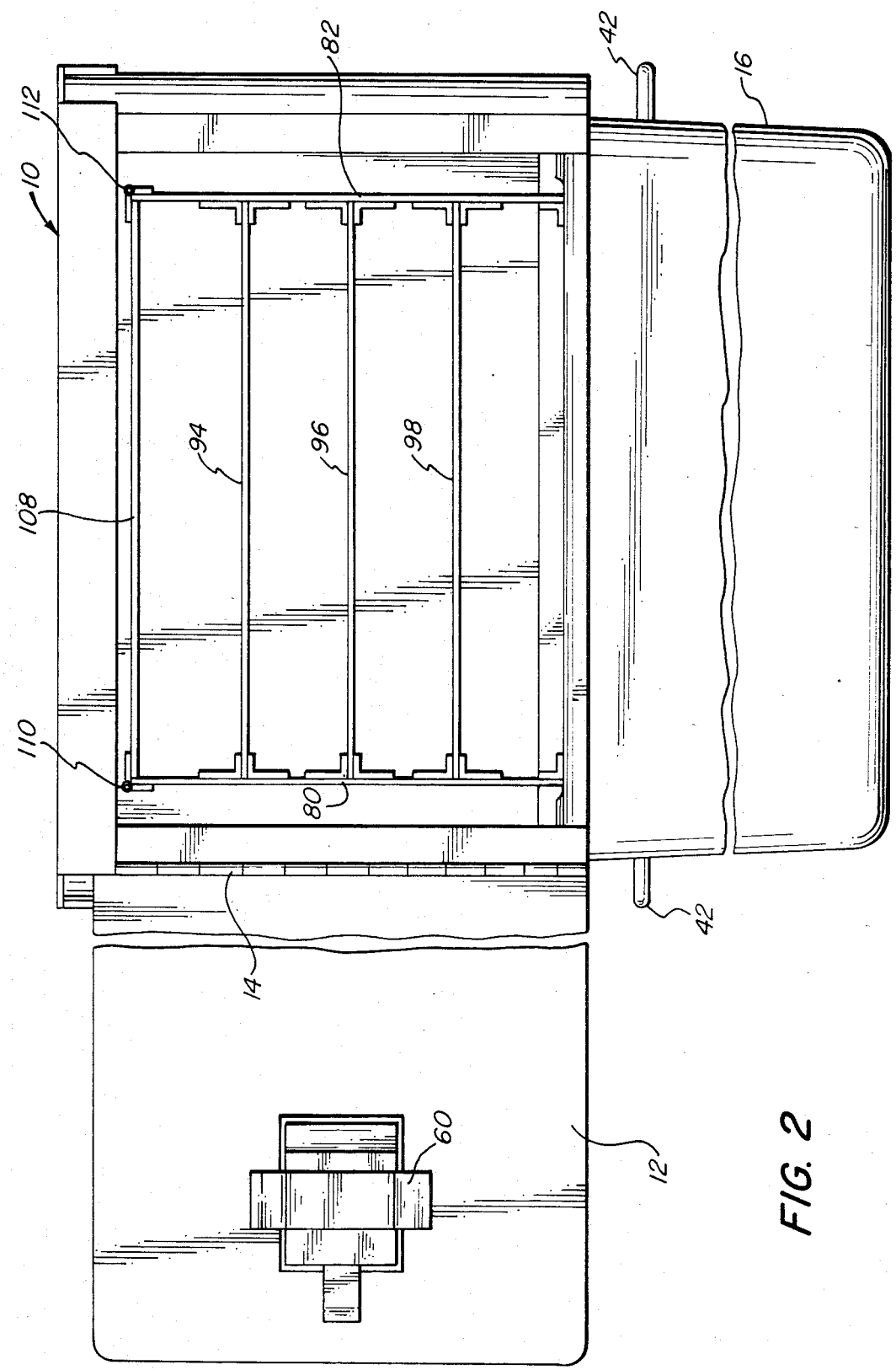
FIG. 2 is a front plan view of the device shown in FIG. 1 assembled, with the access door open to show the interior of the cooking chamber.

Referring to the figures, a device for steam cooking food in accordance with the present invention includes a chamber 10 for containing the food to be cooked. The chamber includes an access door 12 which is secured to the chamber by hinge 14. Access door 12 provides for insertion and removal of food in and out of said chamber. The device also includes a reservoir 16 for containing liquid for producing steam. The reservoir 16 is located beneath chamber 10 to provide for communication of steam through vents 18 in the floor 20 of chamber 10. The device also includes a shelving unit 22 providing for orderly placement and stacking of food within chamber 10.

Figure 3:
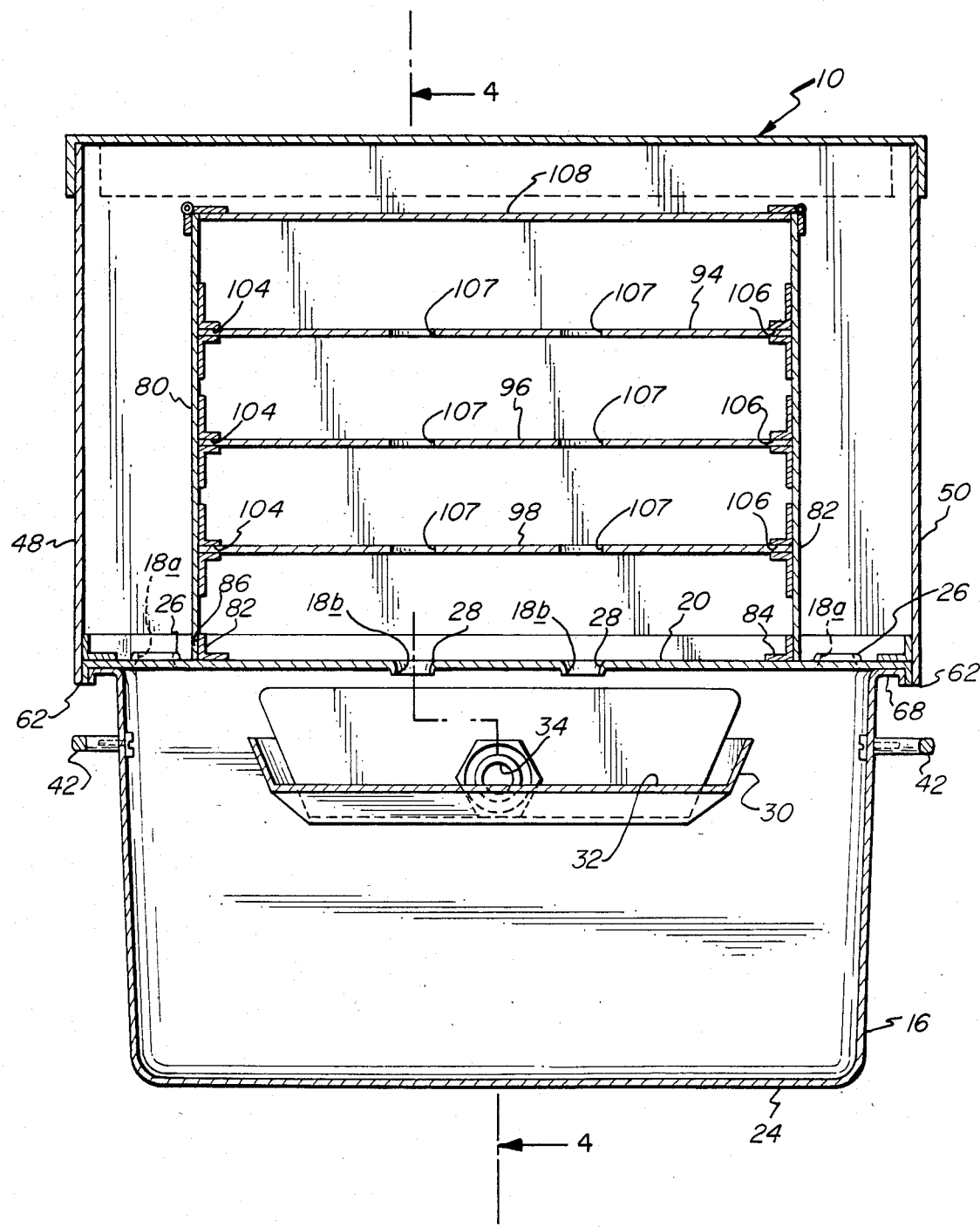
FIG. 3 is a sectional view along the plane 3—3 of FIG. 4.

As shown in FIGS. 1, 3 and 4, floor 20 includes a plurality of vents 18 for transmitting steam from the reservoir 16 into chamber 10. During use, the reservoir 16 is partially filled with water and the bottom 24 of the reservoir is placed on a heat source such as a gas or electric burner. The water is heated to boiling thereby producing steam which rises through vents 18 in the floor of chamber 10. As the steam contacts the food and the walls of chamber 10, the steam is cooled and a condensate is produced. The condensate tends to accumulate contaminates from the food being cooked. In the case where ground beef is cooked, the ground beef has a percentage of fat, and the steam tends to be contaminated with the fat. As the steam is cooled either by the food, or by contact with the walls of chamber 10, the contaminated steam condenses to form a condensate which collects on the upper surface of floor 20 of the chamber. In conventional cooking devices, this condensate would drip downwardly through vents 18 and contaminate the water in the reservoir 16. In accordance with the present invention, the device includes a means by which the contaminated condensate is removed from the device thereby reducing contamination of the water in the reservoir.

Referring in particular to FIGS. 3 and 4, the floor 20 of chamber 10 includes a plurality of vents 18. One group of vents 18a transmits steam from the reservoir 16 into chamber 10 but includes, as will be hereinafter described, a means for preventing drainage of condensate therethrough. A second group of vents 18b transmits steam from the reservoir 16 into chamber 10 and condensate from the floor 20 of chamber 10 back into reservoir 16. In accordance with one aspect of the invention, the group of vents 18a each include around the periphery thereof a generally vertically extending dam for blocking flow of condensate from the chamber floor through vents 18a. The group of vents 18b includes a periphery 28 that is lower in height than the periphery of dam 26 thereby directing the condensate through the group of vents 18b. Thus, as the condensate collects on the upper surface of floor 20 of chamber 10, the dams 26 of vents 18a block flow of condensate through those vents. Since the periphery 28 of vents 18b are lower than the upper periphery of dams 26, the condensate is directed through those vents.

A pan 30 is located beneath vents 18b for catching the condensate. The catch pan 30 includes a floor 32 which slopes downwardly toward a port 34, which provides for drainage of condensate out of reservoir 16. The pan is secured to the sidewall 36 of the reservoir by a pair of hex nuts 38. In addition, the pan may be spot welded to the sidewall 36, or in some other way attached. The device also includes an L-shaped fitting 40 for directing the condensatee out of pan 30. The fitting 40 is preferably made from copper so that its temperature rises when the device is heated thus reducing the likelihood that the fitting will block with solidified fat.

As shown in FIG. 3, the pan is located beneath vents 18b to catch the condensate. Vents 18a are preferably located to the side of the pan to allow free movement of steam upwardly from the reservoir 16 to chamber 10. The reservoir 16 is preferably a commercially available stainless steel pan having handles 42, and modified to accept pan 30. The conventional reservior is modified by providing an opening 44 therein which allows drainage from pan through said opening to the fitting 40.

The chamber 10 includes the floor 20 and four generally vertically extending sidewalls 46, 48, 50 and 52 (see FIG. 1). The chamber also includes a ceiling 54, and the chamber has a generally rectangular box-like configuration. One of the sidewalls 52 includes an opening 58 therein to allow insertion and removal of food. The opening is closed by door 12 at hinge 14. A latch 60 provides for locking of the door in a shut position.

As shown particularly well in FIGS. 3 and 4, the sidewalls 46, 48, 50 and 52 extend downwardly past floor 20 to provide a guide edge 62 around the bottom periphery of chamber 10. The reservoir has a generally rectangular shape including four sidewalls 66 terminating at a generally horizontally directed flange 68, which is best shown in FIG. 1. The upper surface of flange 68 contacts the lower surface of chamber floor 20 and seats thereon. The guide edge 62 restricts horizontal sliding movement of the chamber with respect to the reservoir. However, it should be understood that the reservoir is separable from the chamber to permit cleaning of the vessel.

As shown particularly well in FIGS. 1 and 4, the device further includes a means for canting the chamber with respect to the reservoir to prevent or reduce dripping of condensate out of the door opening 58 when the door 12 is opened. The chamber is canted so that the chamber floor 20 slopes downwardly from sidewall 52 which has the access door 12 installed therein. The canting of the chamber with respect to the reservoir is accomplished by a spacer bar 70 which is inserted between the flange 68 of the reservoir and the lower surface of floor 20 along the sidewall having the access door therein. The spacer bar can be secured either to the reservoir or the chamber, and it is secured preferably by welding, although other means may be used. Canting of the chamber prevents the condensate which may accumulate on the interior surface of sidewall 52 from dripping out of the door opening 58. In addition, in order to further reduce the possibility of drippage, the door opening 58 may include a generally horizontally directed flange 74 which catches the drippings and directs them inwardly into the chamber (see FIG. 1). The flange 74 may be angled slightly from horizontal so that the condensate is directed into the chamber.

As shown particularly well in FIG. 1, the steam cooking device includes a removable shelf unit 22 including two generally parallel vertically extending support walls 80 and 82. As shown in FIG. 1, as well as the other figures, two guide rails 84 and 86 are secured to and extend upwardly from the chamber floor and provided for positioning of the two support walls 80 and 82 within the chamber. The rails 84 and 86 extend generally parallel with respect to each other and the unit is slidable in and out of the chamber through the door opening 58 and is guided by the rails 84 and 86. As shown in FIG. 1, the rails each have an L-shaped cross-section wherein one section of the L-shape extends vertically upwardly and has an outer surface 86 which faces the sidewall of the chamber. The other portion of the L-shaped rail is secured to the floor of the chamber either by rivets or by spot welds, or some other means. The support walls 80 and 82 of the shelving unit 22 has an inward surface 90 facing toward the interior of the unit. The surfaces 90 of the support wall abut the exterior surface 87 of the rails to locate the shelving unit 22 in a fixed position relative to the chamber floor when the unit is inserted into the chamber. This prevents the shelving unit from sliding.

Once again referring to FIG. 1, the shelving unit 22 includes a group of shelves 94, 96 and 98 which are removable to allow the shelves to be cleaned. Each shelf has a left edge 100 and a right edge 102 which fits into a generally horizontal groove 104 and 106 in the support walls. More specifically, the grooves 104 and 106 are provided by L-shaped members having one portion of the L secured to the support walls 80 and 82 and having another portion of the L extending horizontally outwardly from the support walls. A groove 104 and 106 is provided by the space between two adjacent L-shaped members. As shown particularly well in FIG. 1, shelf 98 has been removed from its respective grooves to allow cleaning thereof. The shelves may have a plurality of vents 107 for allowing circulation of steam through the shelves. As shown in FIGS. 1 and 4, the support walls 80 and 82 are connected to ceiling 108 by hinges 110 and 112. When all of the shelves 94, 96 and 98 are removed from the unit, the support walls may be positioned in the same plane as ceiling 108 to provide for cleaning thereof.

It has been determined through testing that the removal of the condensate before it contaminates the water in the reservoir, reduces the amount of time it takes to cook ground beef. The use of a pan which catches the condensate reduces the amount of energy spent cooking the food, and further reduces the disflavoring of the food caused by contact with contaminates in the condensate. The device is particularly simple to clean since the resevoir 16 is seaparable from chamber 10, and the shelving can be removed from the chamber and disassembled. In addition, because the chamber is canted with respect to the reservoir, drippage of condensate out of the door when it is opened is reduced or eliminated.

It should be understood that although specific embodiments of the invention have been described herein in detail, such description is for purposes of illustration only and modifications may be made thereto by those skilled in the art within the scope of the invention.

I claim:

1. A device for steam cooking food wherein energy for producing steam from a liquid is provided by a heat source, the device comprising:
    a chamber for containing said food, said chamber having access means for insertion and removal of said food, said chamber including a floor having a plurality of vents therein;
    a reservoir for containing said liquid heated by said heat source to produce steam, said reservoir being in fluid communication with said vents to transmit steam in one direction, said steam in said chamber producing a condensate containing contaminates from said food, said condensate being transferred through at least one group of said vents;
    said plurality of vents including a second group of vents having means for preventing drainage of condensate therethrough into the reservoir.

2. A device for steam cooking food according to claim 1 wherein said pan includes an aperture for draining said condensate from said pan.

3. A device for steam cooking food according to claim 1 wherein said second group of vents each include around the periphery thereof a generally vertically extending dam for blocking flow of condensate from said chamber floor through said vents.

4. A device for steam cooking food according to claim 3 wherein said one group of vents each include a periphery that is lower in height than the periphery of said dams thereby directing said condensate through said one group of vents.

5. A device for steam cooking food according to claim 4 wherein said means for catching said condensate is located beneath said one group of vents.

6. A device for steam cooking food according to claim 1 wherein said reservoir has a bottom for transferring heat from said heat source to liquid in the reservoir, said reservoir further including a sidewall having an opening therein for drainage of condensate from said pan therethrough.

7. A device for steam cooking food according to claim 6 said catch pan being secured with respect to said sidewall of said reservoir, and including a port for draining condensate from said catch pan through said opening in said reservoir to the exterior of said reservoir.

8. A device for steam cooking food according to claim 7 wherein said catch pan includes a floor which slopes downwardly toward said port to provide for drainage of condensate through said port.

9. A device for steam cooking food according to claim 1 wherein said chamber includes said floor, four generally vertical sidewalls, and a ceiling, said access means comprising a door in one of said sidewalls, said device including a plurality of generally horizontally extending shelves for said food.

10. A device for steam cooking food according to claim 9 and further including:
    a removable shelf unit, said unit including two generally parallel vertically extending support walls, said plurality of shelves extending between said support walls;
    two guide rails secured to and extending upwardly from said chamber floor for positioning said two support walls of said shelf unit within the chamber, said rails extending generally parallel with respect to each other, said unit being slidable in and out of said chamber through said door on said rails.

11. A device for steam cooking food according to claim 10 wherein said rails each have L-shaped cross-sections, one section of said L-shaped section extending vertically upwardly and having an outer surface facing toward the sidewall of the chamber, the other portion of the L being secured to the floor of the chamber, the support wall of the shelf unit having a surface facing toward the interior of said unit, said surface of said support wall abutting said outer surface of said L-shaped rail as said unit is inserted into the chamber to locate said unit in a fixed position relative to said chamber floor.

12. A device for steam cooking food according to claim 11 wherein said shelves of said unit are removable, each said shelf being generally planar and having left and right side edges, each said support wall of said shelf unit including a plurality of generally horizontal grooves each for receiving a shelf edge, the groove of one said support wall being horizontally opposite a groove on the other support wall to provide for insertion and removal of the shelves with respect to the unit by sliding the shelves side edges in and out of their respective grooves.

13. A device for steam cooking food according to claim 9 wherein said chamber has a generally rectangular shape and wherein said sidewalls of said chamber extend downwardly past said floor of said chamber to provide a guide edge around the bottom periphery of said chamber, said reservoir having a generally rectangular shape including four sidewalls terminating at a generally horizontal flange, the upper surface of said flange contacting the lower surface of said chamber floor and seating thereon, said guide edge restricting horizontal sliding movement of the chamber with respect to said reservoir, said reservoir being separable from said chamber to permit cleaning of said reservoir and said chamber.

14. A device for steam cooking food according to claim 13 wherein said device further includes a means for canting the chamber with respect to the reservoir, said chamber being canted so that said chamber floor slopes downwardly from said sidewall to restrict drippage of condensate out of said access means.

15. A device for steam cooking food according to claim 14 wherein said means for canting comprises a spacer bar inserted between the upper flange of the reservoir and the lower surface of the floor along the sidewall having said access means therein.

16. A device for steam cooking food wherein energy for producing steam from a liquid is provided by a heat source comprising:

a chamber for containing said food, said chamber having access means for insertion and removal of said food, said chamber including a floor having a plurality of vents therein, said chamber including four generally vertical sidewalls, and a ceiling, said access means comprising a door in one of said sidewalls, said device including a plurality of generally horizontally extending shelves for said food;

a reservoir for containing liquid for producing steam, said reservoir being in fluid communication with said vents to transmit steam in one direction, said steam in said chamber condensing with contaminates from said food to produce a condensate, wherein at least a group of said vents each include around the periphery thereof a generally vertically extending dam for blocking flow of condensate from said chamber floor through said vents, said sidewalls of said chamber extending downwardly past said floor of said chamber to provide a guide edge around the bottom periphery of said chamber, said reservoir having a generally rectangular shape including four sidewalls terminating at a generally horizontal flange, the upper surface of said flange contacting the lower surface of said chamber floor and seating thereon, said guide edge restricting horizontal sliding movement of the chamber with respect to said reservoir, said reservoir being separable from said chamber to permit cleaning of said reservoir and said chamber;

means for removing said condensate from said device.

* * * * *